(12) United States Patent
Cox

(10) Patent No.: US 8,208,949 B2
(45) Date of Patent: Jun. 26, 2012

(54) NAVIGATION SYSTEM FOR PORTABLE COMMUNICATION DEVICES

(76) Inventor: Marc Stuart Cox, Charlotte, NC (US)

( * ) Notice: Subject to any disclaimer, the term of this patent is extended or adjusted under 35 U.S.C. 154(b) by 963 days.

(21) Appl. No.: 11/687,062

(22) Filed: Mar. 16, 2007

(65) Prior Publication Data

US 2007/0218891 A1    Sep. 20, 2007

Related U.S. Application Data

(60) Provisional application No. 60/783,000, filed on Mar. 16, 2006.

(51) Int. Cl.
 *H04W 24/00* (2009.01)
(52) U.S. Cl. .......... 455/456.6; 455/404.2; 455/456; 455/414.1; 340/990; 340/995.13; 340/995.17
(58) Field of Classification Search .......... 455/404.2, 455/456.1, 414.2; 340/988–996
 See application file for complete search history.

(56) References Cited

U.S. PATENT DOCUMENTS

| | | | |
|---|---|---|---|
| 6,236,365 B1 | 5/2001 | LeBlanc | |
| 6,401,035 B2 | 6/2002 | Jin | |
| 6,504,503 B1 | 1/2003 | Saint-Hilaire | |
| 6,615,131 B1 | 9/2003 | Rennard | |
| 6,647,269 B2 | 11/2003 | Hendrey | |
| 6,697,103 B1 | 2/2004 | Fernandez | |
| 6,862,500 B2 | 3/2005 | Tzamaloukas | |
| 6,925,378 B2 | 8/2005 | Tzamaloukas | |
| 7,734,412 B2 | 6/2010 | Shi et al. | |
| 2002/0173905 A1 | 11/2002 | Jin | |
| 2003/0045301 A1* | 3/2003 | Wollrab | 455/456 |
| 2003/0055537 A1* | 3/2003 | Odinak et al. | 701/1 |
| 2003/0060214 A1 | 3/2003 | Hendrey | |
| 2003/0134648 A1* | 7/2003 | Reed et al. | 455/456 |
| 2003/0139968 A1 | 7/2003 | Ebert | |
| 2004/0077347 A1 | 4/2004 | Lauber | |
| 2004/0090950 A1 | 5/2004 | Lauber | |
| 2004/0157624 A1 | 8/2004 | Hrastar | |
| 2004/0203902 A1 | 10/2004 | Wilson | |
| 2004/0220726 A1 | 11/2004 | Jin | |
| 2005/0065711 A1 | 3/2005 | Dahlgren | |
| 2005/0065720 A1 | 3/2005 | Lewis | |
| 2006/0155460 A1* | 7/2006 | Raney | 701/207 |
| 2006/0182055 A1 | 8/2006 | Coffee | |

OTHER PUBLICATIONS http://www.google.com/gmm/tour.html.
http://www.telenav.com/products/tn/features.html.

* cited by examiner

*Primary Examiner* — Nick Corsaro
*Assistant Examiner* — Quan Hua
(74) *Attorney, Agent, or Firm* — Summa, Additon & Ashe, P.A.

(57) ABSTRACT

A navigation system for portable communications devices may comprise computer programs for providing a geographical context for display in the portable device. The portable device periodically interacts with at least one of a telecommunications network and a GPS network to update an information portal with current location information. The navigation system includes displaying information on the portable communications device representative of a change in location of the mobile telephone device or a change in location of another tracked device. The information representative of the change in location can be overlaid on the geographical context and both displayed in the mobile telephone device. The combined geographical context and specific location data is scaled to fit a display on a portable communications device. Other embodiments provide means for obtaining information representative of a location of some object or of another object for display in the mobile telephone device.

47 Claims, 11 Drawing Sheets

NAVIGATION SYSTEM FOR PORTABLE COMMUNICATION DEVICES

CROSS REFERENCE TO RELATED APPLICATIONS

This application claims priority to U.S. Provisional Patent Application Ser. No. 60/783,000, filed Mar. 16, 2006, which is hereby incorporated herein in its entirety by reference.

BACKGROUND OF THE INVENTION

The present invention relates generally to mobile telephone technology, and more specifically to using mobile telephones or mobile devices for navigation, tracking, both, or the like. Given the rapid development of devices that will benefit from this technology, the invention is best described as providing navigation tools to any portable communications device that communicates via a wireless data network.

The arts of navigation/tracking and portable communications devices emerged from separate origins. However, the increased sophistication of portable communications devices provides a potential opportunity to synergistically converge navigation/tracking technology and portable communications devices technology.

Preexisting user navigation and tracking services do not offer a way for their users to broadcast their current fixed or changing location to a central location so that other mobile users may find them and get dynamic directions to their current location. For example, other user navigation and tracking services such as Google local located at URL http://www.google.com/gmm/tour.html and TeleNav located at URL http://www.telenav.com appear to simply provide an unchanging static map to a predetermined location whose position is fixed. This may not be useful to two or more mobile users attempting to locate each other, i.e., the prior systems cannot assist users with navigational hints by pinpointing where they could converge to meet.

Also, since other user navigation and tracking services do not regularly communicate the portable communication device's location to a database, a user or merchant cannot easily update and share their points of interest or items for sale and their current location with other users or potential customers. Further, other user navigation and tracking services require at least one of the users or merchants to remain at a fixed location until the other user can converge on their location.

Prior publications in this field show attempts to bring navigational data to a user at a remote location. U.S. Pat. No. 6,615,131 (Rennard 2003), for example, shows a cell phone with certain limited navigation features. In particular, a cell phone user can upload a current geographical position to a server that is equipped to download that position to other specified cellular system users. The patent, however, is silent in regard to the scope of navigational data that can be downloaded and offers no disclosure to show updated location plots for users traveling along various routes.

Similarly, U.S. Pat. No. 6,697,103 (Fernandez 2004) integrates GPS data with remote monitoring systems. Fernandez uses a database to store a tracked object's positional movement and transmitting a positional indicator for that object to a remote monitor. Fernandez implements software to modify the object representation of each movement to remotely indicate that the location data in the database has been updated. Although Fernandez does transmit updated location data from a tracked object to a database and then to a remote display, Fernandez does not anticipate displaying the tracking data on a portable communications device. Fernandez only discloses transmitting the updated location information over the Internet.

One other prior publication of interest is U.S. patent application Ser. No. 10/774,034, published as document number 20040157624 (Hrastar 2004). The Hrastar '034 patent application shows a method of tracking a wireless device that has a unique identifier in a data store. Hrastar relies upon sensors spaced throughout the subject geography, however, to track the wireless device. The sensors, of course, cannot provide global coverage and hinder accurate updates in real time.

It would be advantageous to provide improved navigation and tracking capabilities that allow users to more effectively track other users, points of interest, or merchants and would allow a user to navigate with respect to same. As such, new and improved applications for portable communications devices could be enabled. Note that this Background of the Invention is provided merely for explanatory purposes, and is not intended to limit the scope of the present invention as defined by the attached claims in any way.

SUMMARY DISCLOSURE OF THE INVENTION

The present invention includes products and methods for providing enhanced navigation tools to portable communications devices, including mobile telephone device embodiments, computer software program product embodiments, and related method embodiments, all utilizing mapping commands embodied within an information portal. More specifically, the present invention provides embodiments allowing a user to use portable communications devices, such as mobile telephones, hand-held personal assistants, and other mobile devices for navigation, tracking, or both.

The present invention includes mobile telephone device embodiments. The mobile telephone device may be any cellular telephone network device that includes GPS capability, is internet enabled, and provides graphics display capability. The means used in any embodiment of the present invention disclosed herein may be implemented using hardware, using software executed within a processor, or by using both hardware and software executed in a processor. First, means for providing a geographical context for display in a portable communications device are provided. Further, the embodiment also includes means for periodically interacting with at least one of a distributed communications network, such as a cellular network, and a GPS network, since one or both networks may be used to assist a user of the portable communications device to navigate or track another mobile telephone device and/or at least another object. Interactions with one or both of the networks above can allow determination of the current location of the portable communications device and changes in location of a portable communications device and the user. In addition, means for obtaining information representative of a location of another object for display in the mobile telephone device are included in the embodiment. Further, the embodiment includes means for displaying information on the mobile telephone device representative of a change in location of at least one of the mobile telephone device and at least another object between at least two periodic interactions with at least one network interfaced to the mobile telephone device.

In one embodiment, the invention is a computer program product for providing mapping functionality to a first portable communications device. A computer readable storage medium, having mapping commands thereon, communicates with a processor to implement the mapping commands on a personal communications device. In this embodiment, a first personal communications device includes software having a positioning command sequence for calculating a geographical location of a first portable communications device. A communications command sequence is included for periodically transmitting an updated geographical location of the first portable communications device to an information portal. The communications commands further allow the first portable communications device to receive updated geographical locations of other portable communications devices from the information portal. The first portable communications device also incorporates a display command sequence for showing a map on the first portable communications device, the map scaled to include location plots for the first portable device and the other portable devices for which geographical locations have been received. The software that enables the portable communications device to implement the invention may be downloaded to a device such as a cell phone via communication with a larger network, such as the Internet.

The information portal that communicates with a portable communications device may be implemented as a computerized system in electronic communication with computer hardware. The portal is continually updated with location information of portable communications devices via a communications network that receives and transmits mapping information in time periods as close to real time as possible. The mapping information includes a geographical context scaled for display on a portable communications device. The device comprises a computer readable storage medium having mapping commands thereon to show the scaled geographical context and the continually updated location information associated with at least one portable communications device.

The computerized system of this invention utilizes the information portal to for aggregating (i) continually updated location information for multiple personal communications devices and (ii) categories of interest records that can be searched and associated with a personal communications device or with a geographic location. A category of interest describes goods and services that a user would like to pinpoint on a map for easy access.

In one embodiment, a security profile database in the information portal associates user security preferences with portable communications devices and categories of interest records in the information portal. The security profile establishes rules for transmitting information from the portal databases according to rules set up by an account manager in communication with the users.

The invention conveniently utilizes a geographical context server for associating mapping information to a respective portable communications device or to a category of interest record. The geographic context server communicates with the information portal to provide background mapping data used in displaying more specific location points on a portable communications device. The information portal can retrieve background maps from the geographic context server to serve as a starting point in sending navigational directions to a user's personal communications device.

The computerized system is implemented by computer readable storage media in electronic communication with the portal. The portal's storage media having mapping commands that are executable by a processor to create mapping data by overlaying the specific location data of a particular device or object onto the geographical context data. The mapping data is further characterized by overlaying category of interest data associated with a given location onto the geographical context and the location data. In order to display the mapping data on a personal communications device, such as the screen on a cell phone, the portal's mapping commands further scale the mapping data to a proper display size on a portable communication device.

In this embodiment, the scaled mapping data is sent over a data transmission network from the portal to any number of portable communications devices connected to the network. At least one portable communications device connected to the network periodically transmits updated location information to the information portal and periodically receives scaled mapping data from the portal.

The invention is useful in allowing pairs, or even larger groups of users, to locate one another and track each other's progress to a common meeting place. The Summary of the Invention above is provided for illustrative and descriptive purposes only, and not meant to limit the scope of the present invention as defined by the attached claims in any way.

DETAILED DESCRIPTION OF THE INVENTION

Figure 1:
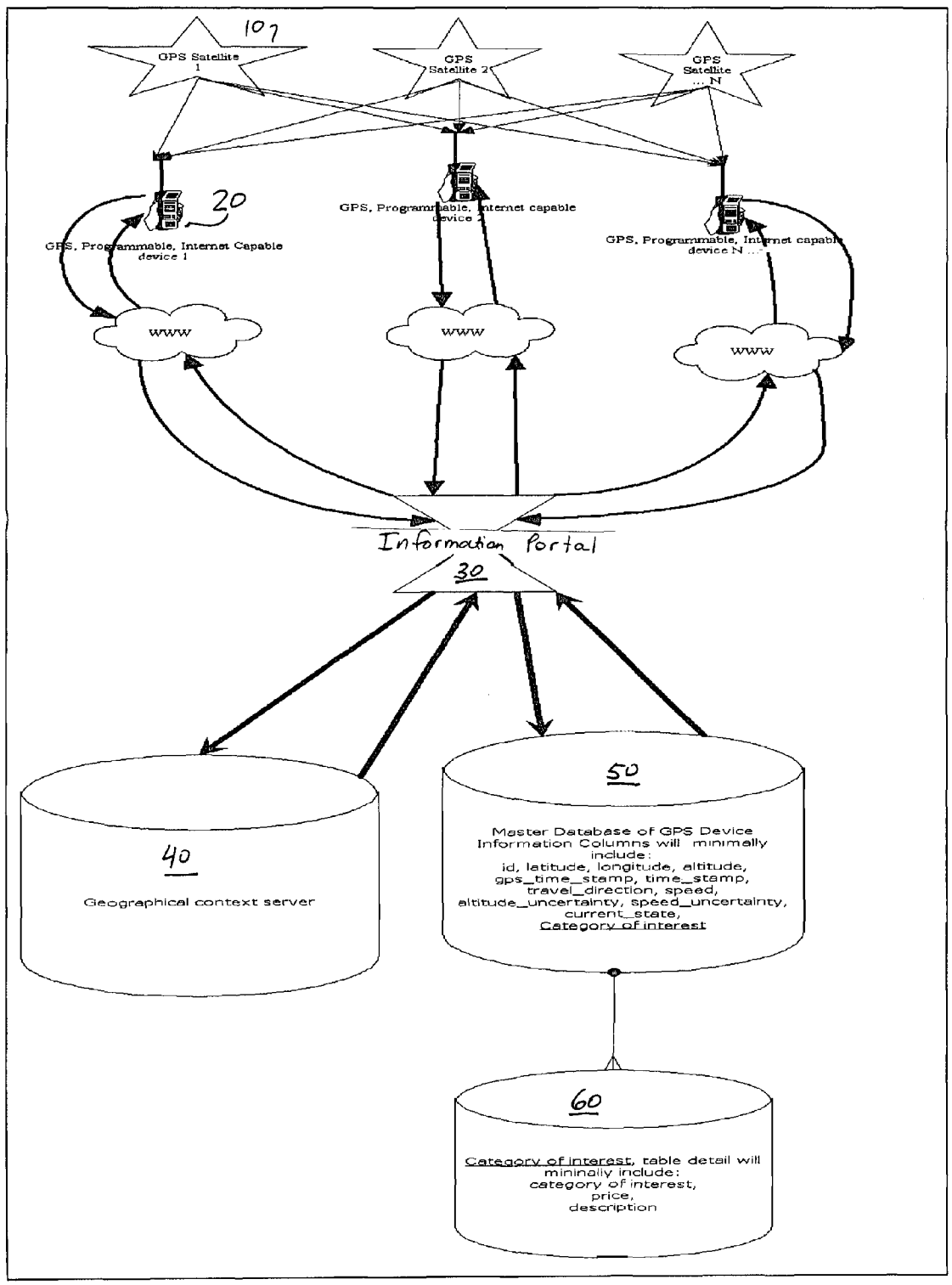
FIG. 1 is an overall diagram of the mapping data flow of the navigation system according to this invention.
Figure 2:
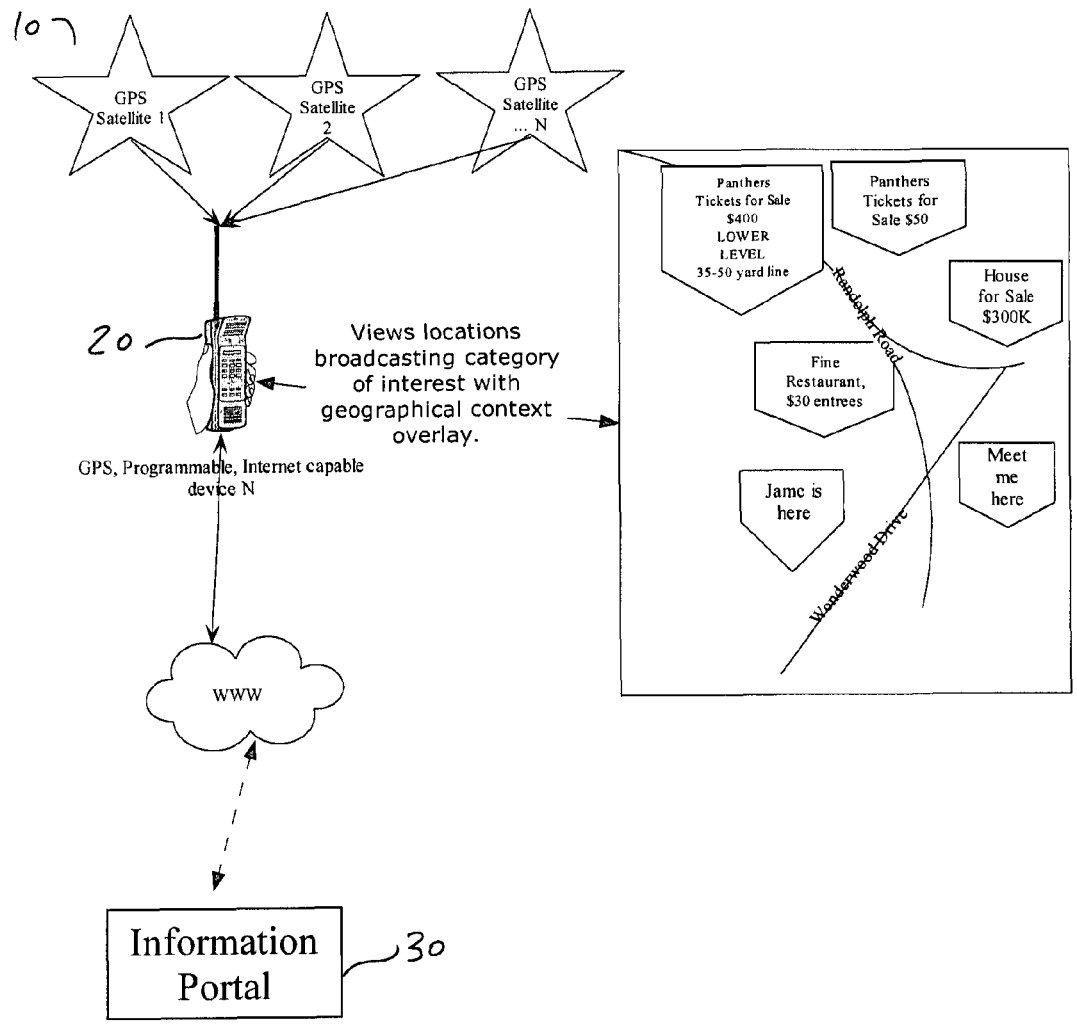
FIG. 2 is a schematic diagram of one portable communications device in telecommunication with a GPS system and the information portal according to this invention.

The invention utilizes an information portal (30) to implement a navigation system that can be used with portable communications devices (20). The term "portable communications devices" as used herein includes any wireless device that transmits and receives data and that can be used at more than one location at the user's discretion without requiring reassembly or immediate reconnection to a power source. Although not limiting of the term, a portable communications device (20) could be a cell phone, a hand held two-way radio, or a personal assistant capable of transmitting or receiving data from a remote source.

The term information portal (30) herein is used in the sense known to those of skill in the art. Accordingly, an information portal (30) provides personalized capabilities to its user or to connected machines. Portals are designed to use distributed applications, different numbers and types of middleware, and hardware to provide services from a number of different sources. In addition, business portals are designed to share collaboration in workplaces. A business driven requirement of portals is that the content be able to work on multiple platforms such as mobile devices, personal digital assistants, and personal computers.

The invention herein brings portal technology to the realm of portable communications devices (20) to provide enhanced navigation functionality over a distributed network. The portal can be programmed in any number of platforms. The information portal of this invention includes software in a preferred embodiment on the Java 2 Platform. The Java 2 Platform Enterprise Edition, also known as J2EE, is part of the Java programming platform for developing and running a distributed Multi-tier architecture. One embodiment herein has the mobile phone software written in the J2ME edition of Java. J2ME is the edition of the Java platform that is targeted at small, standalone or connectable consumer and embedded devices and is therefore is a big plus in resource constrained mobile devices.

Portable communications devices (20), such as cell phones, are generally resource-constrained. Although not limited to such, in a preferred embodiment of this navigation system, the information portal (30) is configured to deliver "mapping data" or "mapping information" as vector based graphics from a geographical context server (40) to the mobile device (20). A preferred embodiment of the mapping information sent from the information portal to the personal communications device is in a format known as SVG (Scalable Vector Graphics).

SVG is an XML markup language for describing vector graphics, both for static and animated images. Strictly defined SVG is currently constrained to two-dimensional/2D graphics with 3D effects, however general vector based graphics have no such 2D limitation. Raster based image formats like GIF or PNG encode the color contents of each pixel of the rectangular region that comprises the image. In contrast to raster based image formats, a vector based image format instead contains only the drawing instructions. Therefore, the vector representation of an image can be much more compact, a major advantage in resource constrained mobile devices. Vector graphics have several other notable advantages for mobile applications. Among such advantages are features such as the fact that vector graphics is compact, scalable and easily transformed. Also, vector graphics provide drawing instructions so that the image can easily be scaled down, flipped, and rotated on the mobile device.

One goal of the invention herein is to provide a portable communications device (20) with enhanced navigation capabilities. In this embodiment, the portable communications device (20) must include software for displaying mapping data on a screen (510) within the device (20). In a first embodiment then, the invention is a computer program product for providing mapping functionality to a first portable communications device (20). The computer program product includes a computer readable storage medium having mapping commands thereon, the mapping commands being executable by a processor and embodying a positioning command sequence for calculating a geographical location of the first portable communications device (20); a communications command sequence for periodically transmitting an updated geographical location of the first portable communications device (20) to an information portal (30) and receiving updated geographical locations of other portable communications devices (20) from the portal; and a display command sequence for showing a map on the first portable communications device (20), the map scaled to include location plots for the first portable device and the other portable devices for which geographical locations have been received.

The portable communications device (20) preferably has the capability to communicate at least one way with a satellite system (10) to determine the most precise location coordinates for that personal communications device (20). Portable communications devices (20) with this feature then have the ability to transmit at a minimum a device identifier, latitude coordinate of the device, longitude coordinate of the device, altitude coordinate of the device, a global position time stamp, a device clock time stamp, calculated positional parameters, and combinations thereof.

As an example, many cell phones include a receiver for accepting data communications from a Global Positioning System (GPS) or an Assisted Global Positioning System (A-GPS). A-GPS differs from regular GPS by allowing a device to communicate with an assistance server that calculates position more rapidly than the device could calculate within its own software. The portable communications device (20) of this invention incorporates the appropriate positioning command sequence that calculates the current geographical location of the portable device from data received from a global positioning system (10). The personal communications device (20) then transmits this position up to the information portal (30) for storage in a database or other information store. This sequence may be repeated multiple times in any given period with better accuracy being achieved by calculating and transmitting the updated position of the portable communications device (20) as quickly and as often as possible. Of course, the information portal (30) may be in data communication with any number of portable communications devices and maintain data associated with each device individually. The computer program product installed on a portable communications device (20) according to this invention includes a display command for showing the location of each respective portable communications device at updated intervals determined by said first portable communications device.

Figure 5:
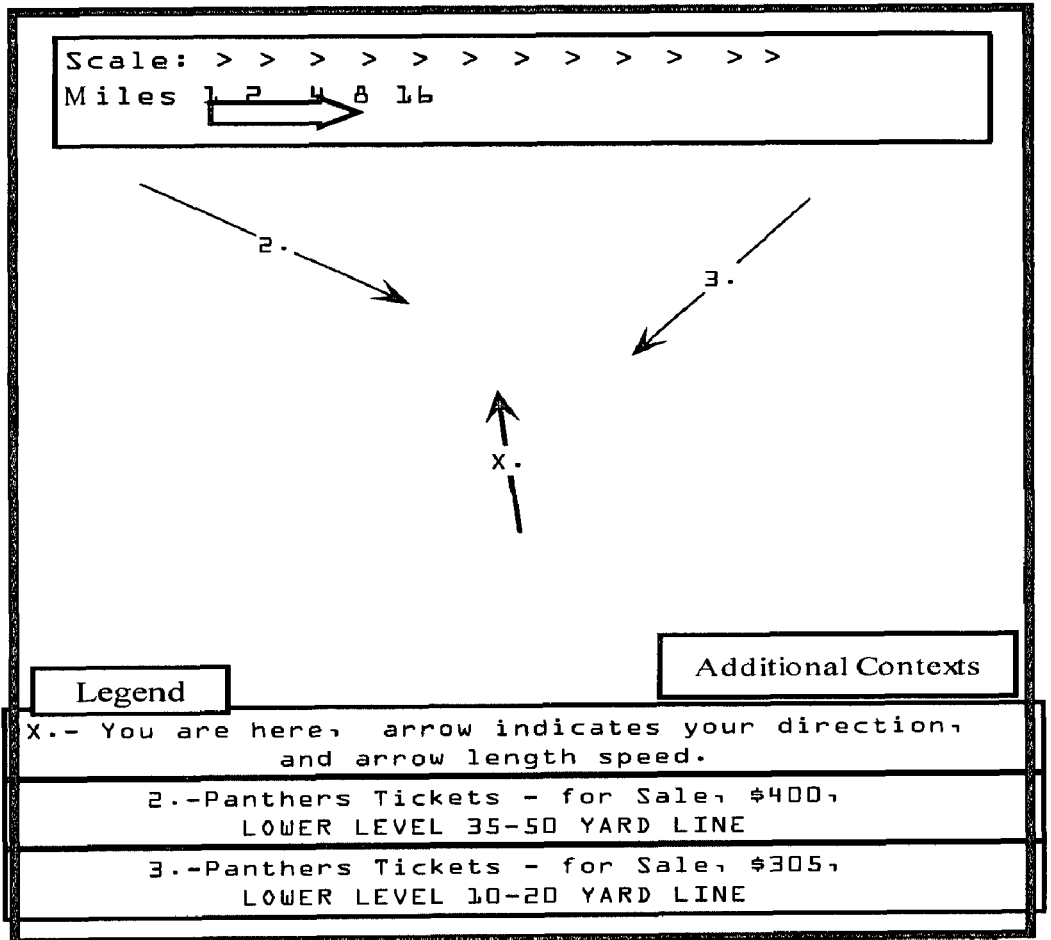
FIG. 5 is a schematic of the display of one portable communications device having positional vectors showing the locations and details of travel for other devices in the network.
Figure 5:
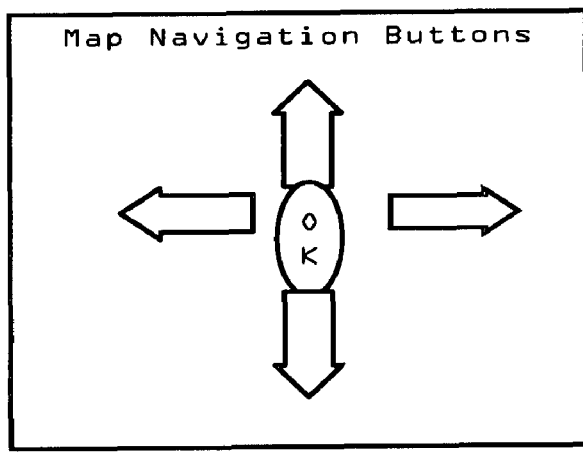

As noted above, the computer language known as scalable vector graphics (SVG) is one efficient means of sending location data from the information portal (30) to a portable communications device (20). The scalable vector graphics are useful in sending compact data sets to the portable communications device. For example, as shown in FIG. 5, the location data and information regarding the speed and direction of travel can be encompassed in a simple vector graphic for ease of use.

On the portal (30) side, the system claimed herein provides more complex data manipulation and system administration. First, the portal (30) is in telecommunication with any number or type of portable communications devices (20). As described above, those devices calculate their own geographical position and transmit those coordinates to the portal for storage in a database record associated with that particular portable device (20). In this way, the portal (30) can immediately update its records for portable devices and maintain an up to the minute (or even up to the several seconds) account of where any given device is currently located. By maintaining the location data for an entire network of portable communications devices, the portal (20) is able to share that information with any number of portable communications devices (20). For example, the portal may be connected to a communications network that transmits mapping information to at least one portable communications device. In a preferred embodiment, the portal (30) is in electronic communication with a geographical context database (40). The geographical context database (40) includes all of the graphical information necessary to display a map of any number of locations. These maps include geographical information of varying levels of detail for most regions of the world. The amount of detail included in any given map is generally up to the user to select. The geographical context database (40) can provide the portal (30) with a background map to be customized for the system herein. For example, the geographical context database (40) may provide street level map of a portion of the city in which any given portable communications device is located. The location of any given portable device (20) would then be plotted on top of this background map, or geographical context. This type of plotting is often done in layers so that the location of the portable device overlays the geographical context. The portion of the overall map available from the geographical context server may be a tile that shows one section of a map in the desired level of detail. While not limiting in any way, a "tile" is a graphic image that has a scalable size and sufficient graphics content to provide a mapping background for a given application.

It is often desirable, however, for portable communications devices (20) to maintain a minimal level of processing capability to conserve space and energy use. It would, therefore, be very difficult for a portable communications device to display all of the details available from the information portal. For this reason, the invention herein includes a feature of scaling the mapping information that the information portal creates for any given portable communications device. The mapping information gathered by the information portal is scaled to appropriately fit a given portable device (20). The mapping information is also scaled to display the most usable amounts of information that portable device user could interpret at a given time. This includes providing fewer details if the portable device (20) is moving at high rate of speed and providing more details if the portable device is moving slowly. In this regard, the software at the information portal (30) includes sufficient artificial intelligence to analyze data gathered from respective portable communications devices and can decide the best size, format, and complexity of the mapping information that can be transmitted back to a portable communications device (20). The information portal (30) is then characterized in part by its ability to retrieve (through a receiver) and disseminate (through a transmitter) continually updated location information associated with at least one portable communications device. In another sense, the information portal (30) is further characterized in its programming features that enable the portal to scale a mapping data set, or mapping information, to any desirable size and resolution. The software for scaling graphics, including mapping tiles, can be programmed in a number of ways and generally comprises selecting only the most important data for transmission to a portable communications device.

The dynamic nature of the information portal (30) according to this invention lends itself to a wide variety of useful applications. In one case, the information portal (30) can be programmed to accept data regarding the location of certain goods and services available within a certain area. In this way, vendors that advertise goods and services can make their locations available for plotting within a certain geographical context as part of the mapping information downloaded to a portable communications device. Similarly, a user of the portable communications device (20) can update the portal data associated with that device so that the portal can help match the user with the goods and services located in a certain region.

The invention encompasses a computer implemented method of communicating mapped advertisement information to portable communications devices by continually updating an information portal with location information for portable communications devices. As noted above, this location information may be derived in part by the portable device's communications with a global positioning system (10). Next, the information portal (30) continually updates its records with categories of interests that can be matched to a personal communications device (20) or to a location. In other words, the portal manages data that a user associates with that user's device, e.g., favorite restaurants, stores, addresses, and other locations that will be useful for retrieval later. These data entries are referred to herein as "categories of interest" and are stored in a categories of interest database (60). The information portal (30) can maintain these types of preferences so that a portable device (20) user can search the categories as the user enters a certain location with the portable device (20). Similarly, vendors, whether using a portable communications device (20) or not, can maintain records in the information portal to advertise their goods and services at certain locations over the navigation system of this invention. The portal maintains descriptors of the vendors businesses along with spatial coordinates of the vendors' locations. This data is available to be transmitted to a portable communications device (20) if a user indicates an interest in a common category of interest and enters the region where the vendors' goods and services are available.

As a first example, a portable communications device (20) user may enter a certain location and search a category of interest such as restaurants to locate food establishments nearby. Upon querying the information portal (30), the method of communicating advertisements to the system user will include retrieving the geographical context of the location in which the user is currently positioned. Of course, the portal knows where the user is positioned because the system has already been updated with GPS data in the portal databases. At this point, the method includes overlaying the location information atop a general geographical context map. For instance, the software at the portal side of the invention uses SVG to create a draft mapping tile showing the background information that a user would need, possibly at the street level, and then pinpoint the user's exact location within that mapping tile. As space permits, the portal software would also provide textual or graphics data advertising the goods and services available at distinct locations.

Next, the method of a preferred embodiment of this invention includes scaling the geographical context, the location information, and the category of interest information for display on a portable communication device. Afterwards, the information portal (30) is periodically transmits updated and scaled mapping information to at least one personal communications device (20). The mapping information may be selected from the group consisting of the geographical context, the exact location information, and additional advertising information showing the category of interest in that area. Typically, the transmitted mapping information is in the form of a mapping tile, i.e., a single graphic image comprised of layered graphics data.

On the portable communications device (20) side of the system, the portable device is programmed and adapted for displaying the updated and scaled mapping information on the at least one portable communications device 20), the device including mapping commands that are executable by a processor in the portable communications device. The mapping information may be displayed on a screen (510) on the portable device (20)

It will be understood that a person using a portable communications device (20) within the navigation system of this invention would be able to maneuver throughout any geographical location, constantly updating the location coordinates for that device by communicating with the information portal. Of course, there will be regions where such communication is not possible; therefore, the portable communications device will have software available for caching the most recent geographical context and location data for display until the portable communications device re-enters a region in which it can communicate with the information portal.

Figure 3:
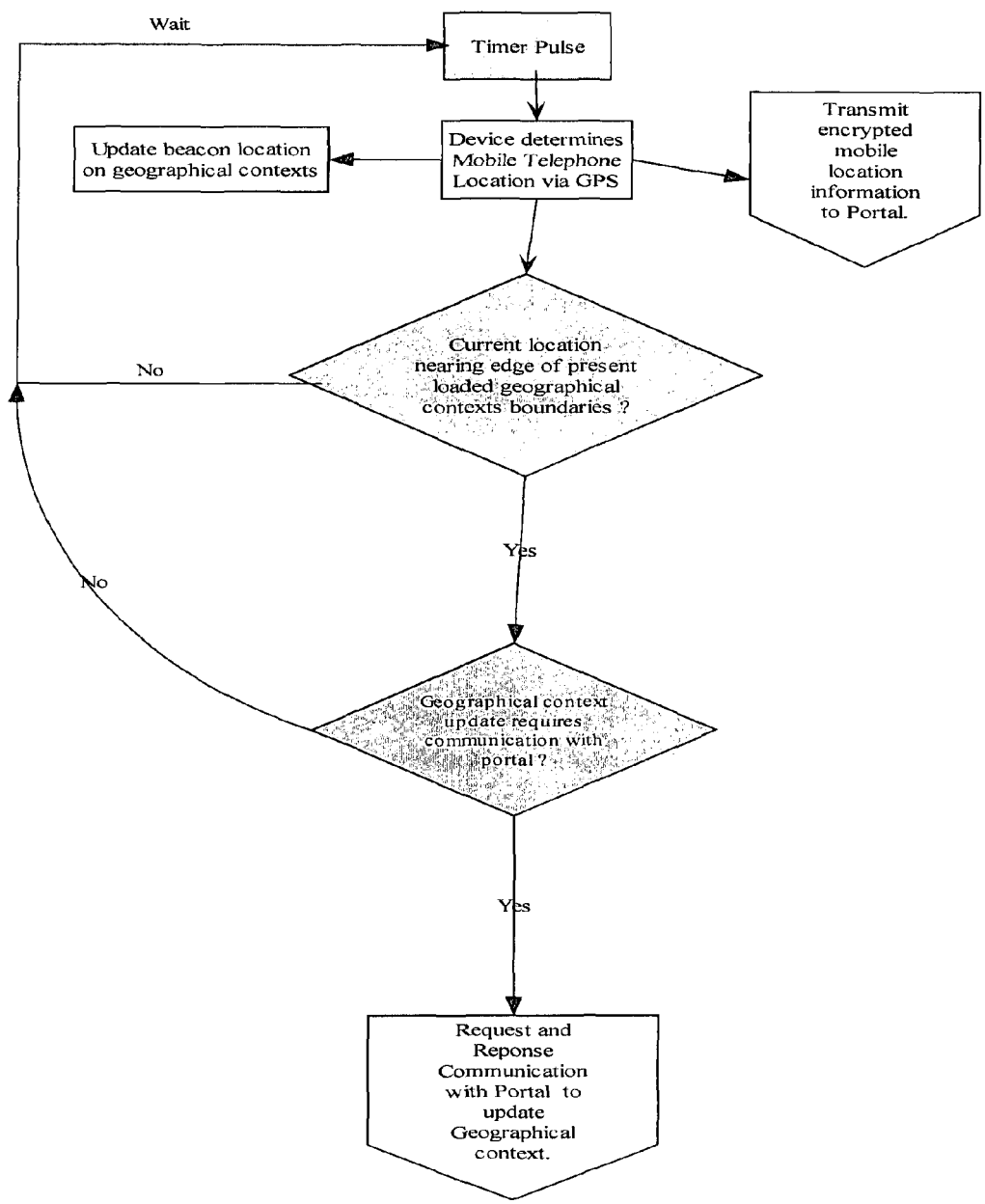
FIG. 3 is a flowchart showing the high level logic of the software for providing mapping data to a personal communications device according to one embodiment.
Figure 4:
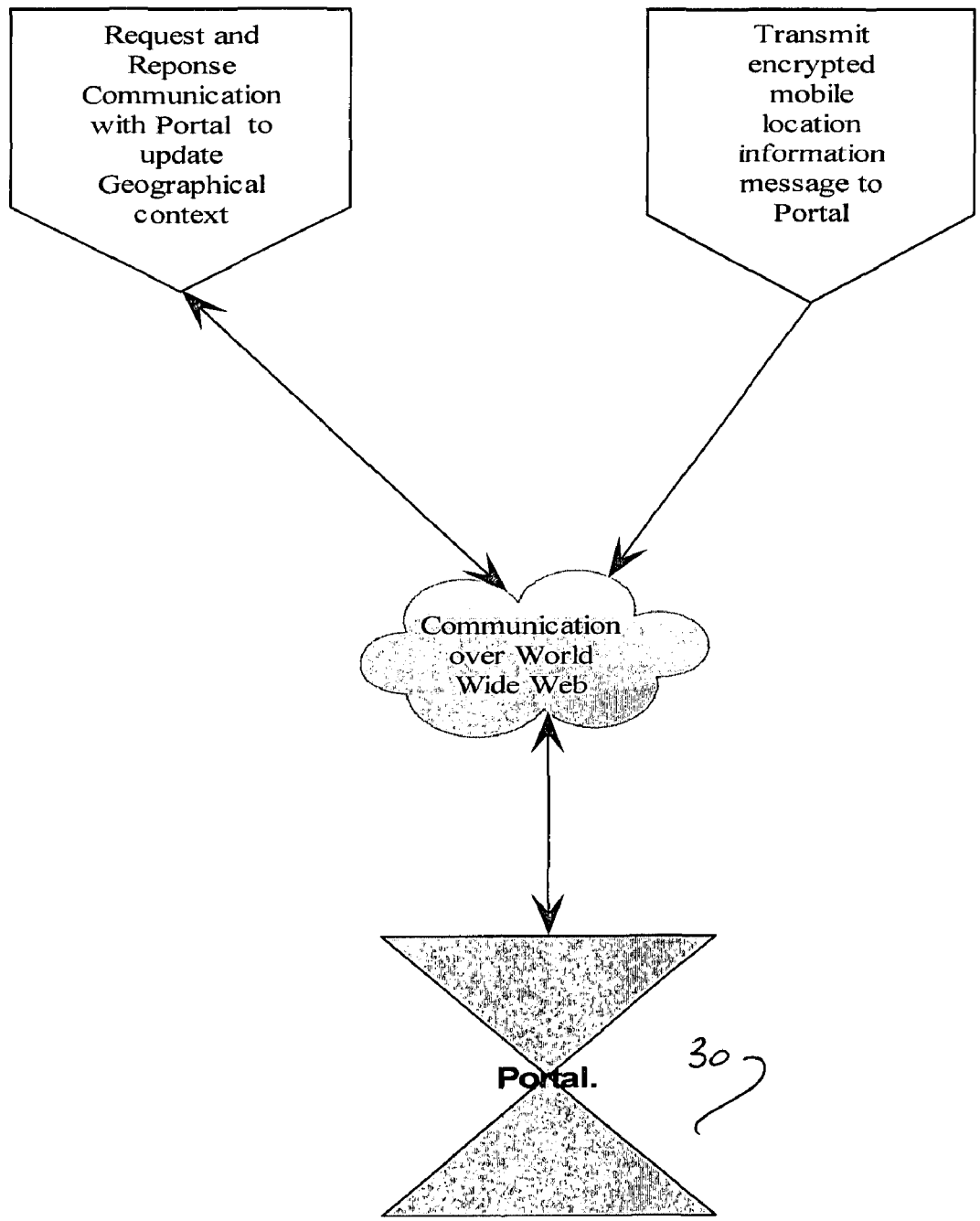
FIG. 4 is an overall diagram of the system communications to and from the information portal according to this invention.

As shown in FIG. 3, the system accounts for the fact that the portable communications devices (20) may be moving in and out of geographical regions. Accordingly, the system accounts for changes in device location. Upon initially contacting the information portal (30) for a location update, the portable communications device (20) transmits its current position as determined from its communication with the geographical positioning system. As described above, the information portal (30) uses this information to select the geographical context, or background mapping tile, on which more particular location and advertising information may be attached. As a portable communications device continues to move, the location coordinates stored in the information portal (30) are updated as often as the communications system will allow. In certain embodiments, the portable device user has the option of determining how often the portable device transmits updated location information to the information portal. By reducing the number of transmissions to and from the portal, the user will be able to manage power consumption in the portable device (20).

The software on the portal side can also determine when the location has changed a sufficient amount so that a new background map, or geographical context, should be transmitted to the portable communications device. In this way, the portal can maintain the proper display on the portable device. In other words, the information portal (30) is programmed to determine when the portable communications device (20) has exceeded the scope of the mapping tile currently being display on the portable device (20). The information portal (30) then transmits a new background map for the display.

The information portal (30) of this invention also encompasses numerous administrative and security features that enhance the overall navigation system. First of all, as discussed above, a user has options on a portable communications device to transmit data to the information portal customizing the data record for that portable device. Among the features that can be customized are categories of interest for advertisement purposes and identifiers for other portable communications devices that a user would like to communicate with or track via the mapping functions described herein.

Of particular importance to many users, the mapping system of this invention includes significant security features. In general, the portal includes a database for aggregating (i) continually updated location information for personal communications devices and (ii) categories of interest records that can be surged associated with a personal communications device or with the geographical location. The portal also includes a security profile database for associating user security preferences with portable communications devices and categories of interest records. The security profile establishes rules for transmitting information from the portal to serious portable communications devices (20) within the system. For instance, a user can specify that a particular portable communications device (20) cannot receive advertisements from certain establishments or cannot track certain other portable devices. In general, any number of configurable features can be managed through the information portal either by allowing the user to enter data from the portable device or by having a system administrator with direct access to data in the portal.

Devices, systems, and methods to assist users with directed navigation and tracking that attempts to solve the problems above are provided in embodiments of this invention. Also, since at least some other user navigation and tracking services do not regularly communicate the portable device's location to an information portal (30) which then aggregates the information into a database, a user or potential merchant cannot easily update and share their interests or items for sale and their current location with a larger group. Embodiments of the invention can aggregate and distribute this user navigation and tracking information because communicating with a larger group is more likely to satisfy the user's interests or sell a merchant's goods or wares.

Further, at least some other user navigation and tracking services require at least one of the persons or merchants to remain at a fixed location until the other person can converge on that location to meet them, whereas embodiments of the invention provide the needed mobility to all the users of embodiments.

One reason embodiments of the navigation system disclosed herein has advantages to users is because it regularly communicates the portable communications device's (20) location and user's categories of interest (60) to the information portal (30) where the information is saved in the database. As such, a user can navigate with respect to another mobile telephone user, a point of interest, or both. Also, a merchant can easily and dynamically update and share their interests or items for sale and their current location with a larger group whose members may be able to satisfy the user's interests or may possibly wish to purchase the user's or merchant's goods or wares. An example of this is in FIG. 7, where there are two merchants with football tickets for sale and a customer who is tracking the 'football tickets for sale' category of interest that has been previously transmitted to the information portal. Certain other embodiments provide a way for the customers and merchants to locate each other, provide a suggested meeting place where the customers and merchants might converge, and provide the estimated time of arrival or "ETA" for all interested users. Thus, the system provides users an improvement in user navigation and tracking services, and also helps merchants in their efforts to dynamically locate and track their assets or advertise to potential customers and markets in near real time from any place at any time.

In analyzing the navigation system of this invention, other advantages become apparent in regular communication of the portable device's location and the user's categories of interest and the saving of this information to the database for storage and retrieval. As such, an embodiment may automatically update location and facilitate updates to categories of interest information for merchants and customers, so that advertising merchants and customers can easily locate each other to form dynamic ad-hoc markets. This reduces the time to market for vendors to advertise their products and adds convenience for consumers who are searching for the merchant's goods or wares. Another advantage of saving this information to the database for storage and retrieval is the central management of security, which allows authorized users and the security administrator managers direct control over who has access to the portable device's locations and user's categories of interest information.

Since embodiments of the invention allow the mobile telephone devices to regularly communicate with an information portal, there are several more functions available to users of embodiments of the invention. For example, one tracking function offered is that of sending a notification alert via SMS text messaging or a voice message to a portable communications device (20) whenever a different portable communications device on the network is arriving within or departing outside a certain distance of an approved or disapproved location or other user/object. For example, parents might want to be notified if their children arrive at school by receiving a SMS text message whenever one of their children is within a 100-yard radius of their school. Also, parents might want to be notified with a warning when or if one of their children were to go outside the region encompassed within a 200-yard radius of their school. Other functionality provided to users of embodiments of the invention include allowing or disallowing a certain path or region of travel for a certain time of day, and SMS text message notification alerts when and if the mobile telephone is located along the user's defined path or region.

Figure 7:
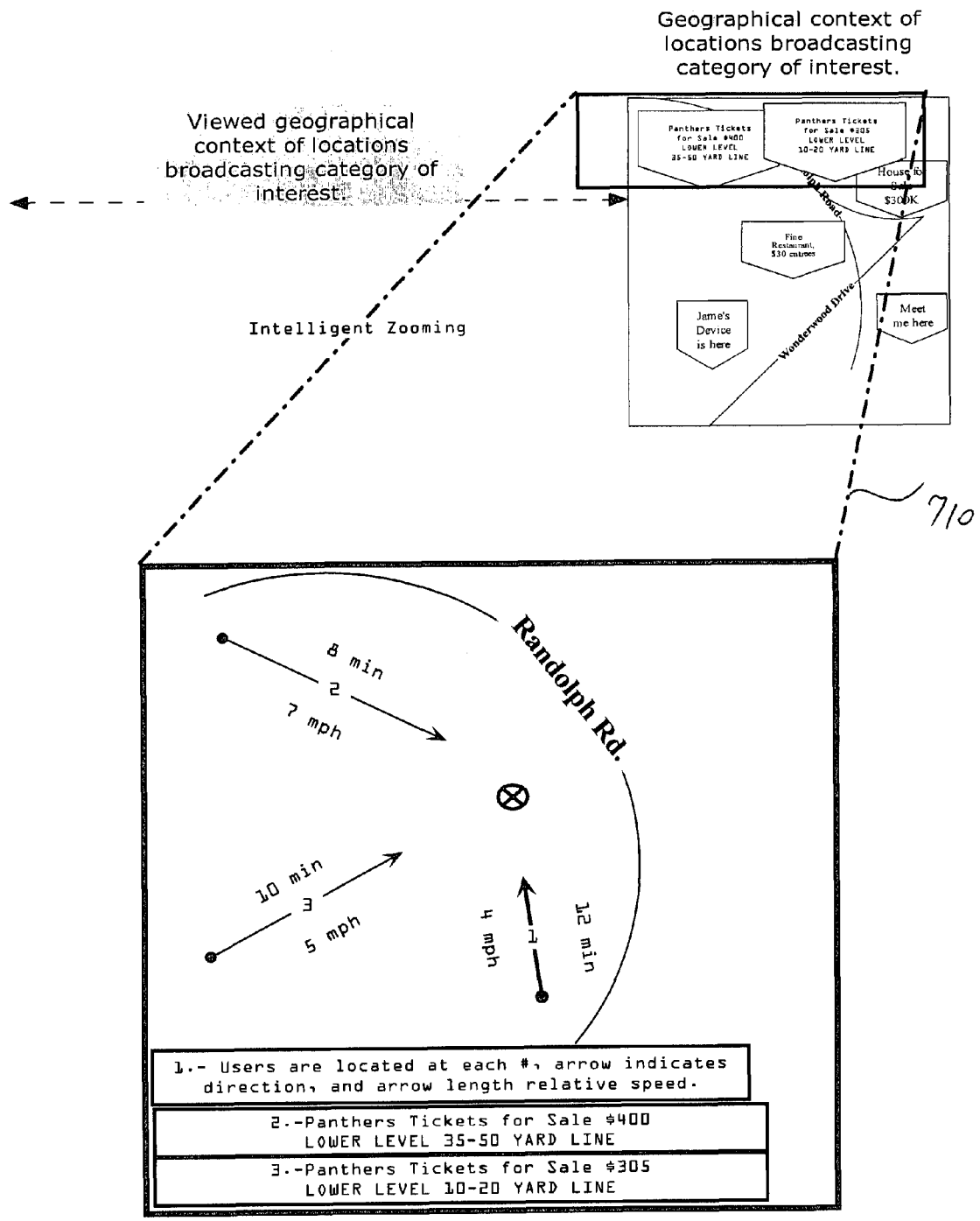
FIG. 7 is a schematic showing the zoom function of one personal communications device implementing the navigational system of this invention.

Because embodiments of the invention allow the portable communications devices (20) to regularly communicate with the system information portal (30), other user's positions, velocities and directions of travel may be communicated to numerous authorized portable devices. As such, the mobile telephone software can use this information to project the point of intersection or convergence where the group can meet and may display that intersection point as a pulsing beacon or some other indication as shown in FIG. 7. The precisely calculated intersection or meeting point can be updated as often as the portable communications devices (20) are in communication with the system's portal (30), or, when communication with the system's portal (30) is not available, an estimated projected intersection or meeting point is calculated as often as determined by the timer shown in FIG. 3. The timing of the intervals during which the portable communications devices (20) attempt communication with the system's portal (30) is determined by the timer shown in FIG. 3, and by intelligence in the portable communication device (20) software which saves the user from excessive data transmission charges by transmitting data only when the user's location has changed by a defined amount. For example, the distance between a mobile telephone device and another mobile telephone or point of interest, the velocity of movement towards or away from a mobile telephone device, and another mobile telephone or point of interest, or the like, may be used to determine how often communication with the system portal occurs.

Due the relatively smaller screen size generally available with typical hand held mobile telephone devices and other portable communications devices and to give the user the most relevant and most quickly recognized information, embodiments of the invention carefully manage the amount of information and level of detail presented visually to a portable communications device (20) user. In order to manage this, one can observe that a user traveling faster than a certain speed, for example 55 mph, is generally not interested in small side streets but only major landmarks such as an airport, interstate highways and major through fares. This is on account of the user is moving relatively fast and as such passes small side streets relatively quickly. However, a user traveling slower than a certain speed, for example 20 mph, generally is interested in smaller landmarks and side streets than in major landmarks that take considerably longer to reach. To achieve this some embodiments of the invention automatically adjust the scale of the geographical context(s) and the amount of detail in the geographical context(s) depending on the speed of the user's travel and their relative closeness to their selected point(s) of interest.

Other system embodiments also provide for a way to operate whenever a cellular network or other data distribution system is not available by caching information on the mobile telephone device until the distributed network becomes available again. In addition, embodiments may use the GPS network at times during which the cellular network is unavailable. When the cellular network is unavailable, one system embodiment will continue to provide directional assistance on the mobile telephone in the form of directional vectors to indicate various parties' relative positions, distances and speeds as shown in FIG. 5. By projecting the current position of each party based on their last know position, heading and velocity, the user can maintain navigation capability.

From developer experience using embodiments of the invention, one can determine that a directional vector can supply sufficient information to assist the user with deduced or 'dead' reckoning during the part of a user's travel when communication over a distributed network is unavailable. Indeed, simple vectors overlaying geographical contexts are sometimes preferable to other geographical contexts, especially when traveling over short distances or low speeds such as walking to locate nearby football tickets for sale.

Figure 6:
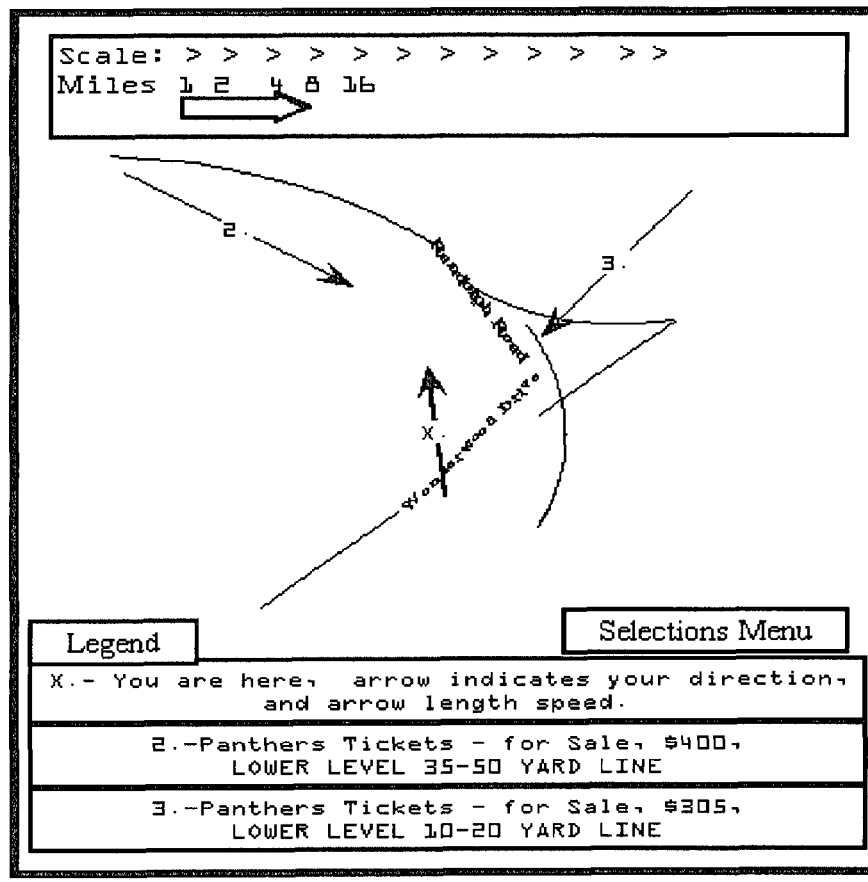
FIG. 6 is a schematic showing the location information for several portable communications devices incorporated onto the appropriate geographical context as displayed on the screen of one such device.
Figure 6:
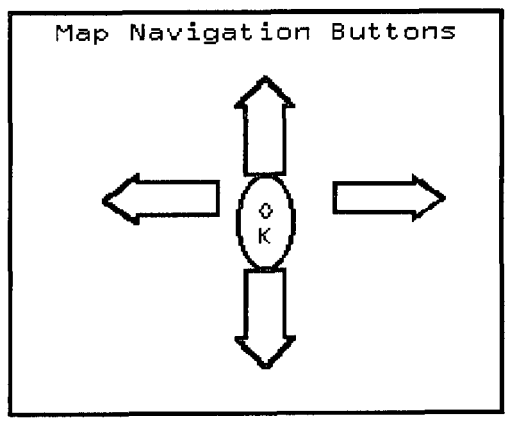

However, even with all the functional advantages embodiments of the invention provide when a distributed or cellular network is not available, when the data network is available, a vector context overlaid on a road geographical context, which is auto-scaled to include all categories of interest as shown in FIG. 6, supplies even better information to the user.

Although not a primary function of system embodiments, it is also possible that embodiments can also be accessed by regular desktop personal computers that have access to the World Wide Web.

So that users and merchants can more easily locate each other, the portable communications device (20) menu selections support the functions above with a user configurable search range that is location aware. The search range can be configured by the user to include all nearby categories of interest within a certain distance of the user's current location by allowing the user to choose the length of the radius that they wish to search within for all their subsequent queries or notification alerts. Since this location aware search range is dynamically updated based on the user's current location, the information selected by and provided to the user is the current relative locations of the user's interests in real time.

Although not a primary function of system embodiments, it is this newly disclosed system that can also provide the user with the alternative to base their queries to include all items in their categories of interest regardless of nearness to the user's current location. In this case, at least some embodiments of the invention will automatically calculate the length of radius or boundaries that encompass all items in the user's selected categories of interest and save that value for all of the user's subsequent queries or notification alerts. FIGS. 8, 9, 10, and 11 are detailed menu options available on mobile telephone or desktop browser as system users view them.

The security administrator manager is a software module that executes on the information portal (30) server which produces web pages specially written to be viewable on the portable device (20). The security administrator manager functions are also available via desktop browser. In any case, the security administrator manager account is logged in and authenticated using standard security protocols and techniques.

Figure 8:
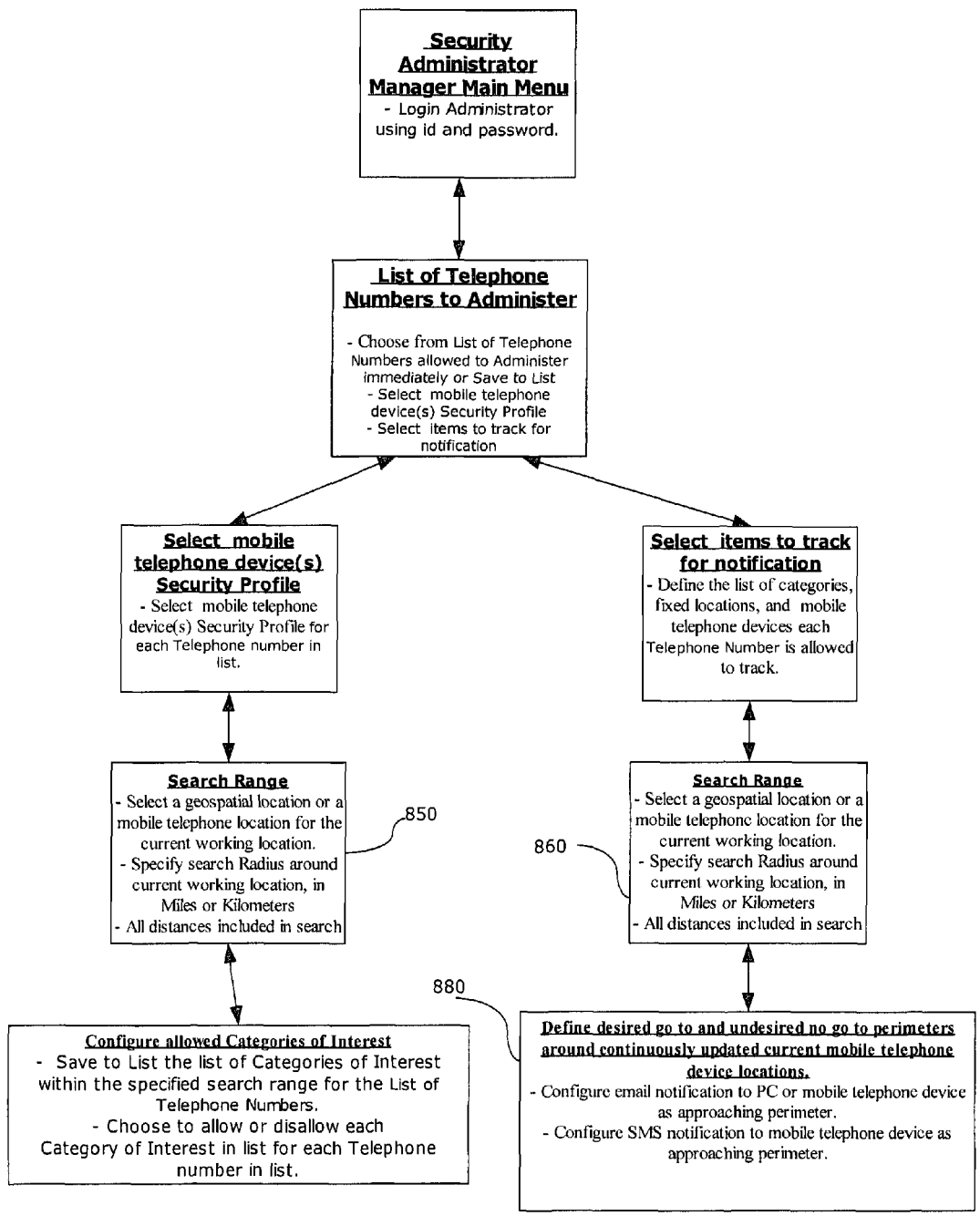
FIG. 8 is a software flow chart illustrating the method of providing security preferences to a personal communications device implementing the navigational system of this invention.

During user registration, a system user registers their portable communications device(s) (20) for the service by using the security administrator manager menu options shown in FIG. 8 to create their account. Portable communications devices (20) can be uniquely identified by telephone number, IMEI identification, or SIM identification, but the system can be used to locate both mobile and fixed location land line telephones; therefore, regular telephone numbers are the unique identification number associated with the account identification. Note that points of interest or another object other than a mobile telephone can also be uniquely identified by using a unique telephone number, a unique GPS location, or both in combination. Using regular telephone numbers as part of a unique identifier for embodiments has the additional benefits that it is commonly listed in merchant advertisements, familiar to users, and there are databases of telephone numbers available on high capacity media such as CDs, DVDs etc.

Figure 9:
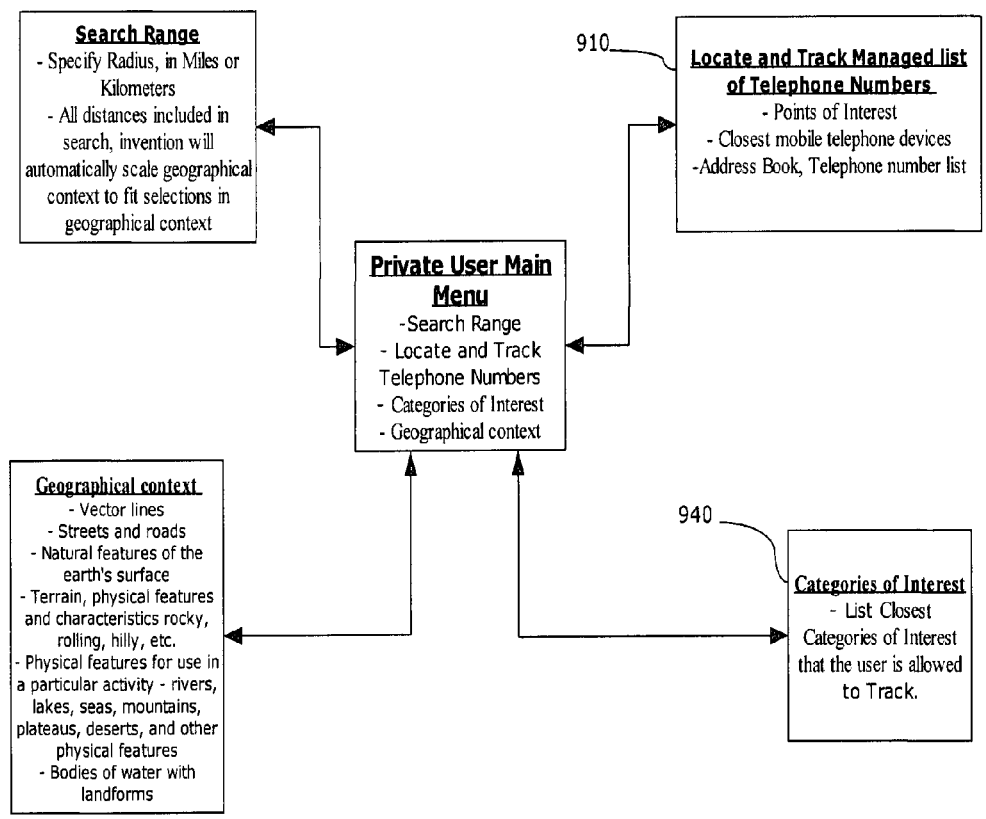
FIG. 9 is a software flow chart illustrating the menu options for a portable communications device utilizing the navigation system of this invention.
Figure 10:
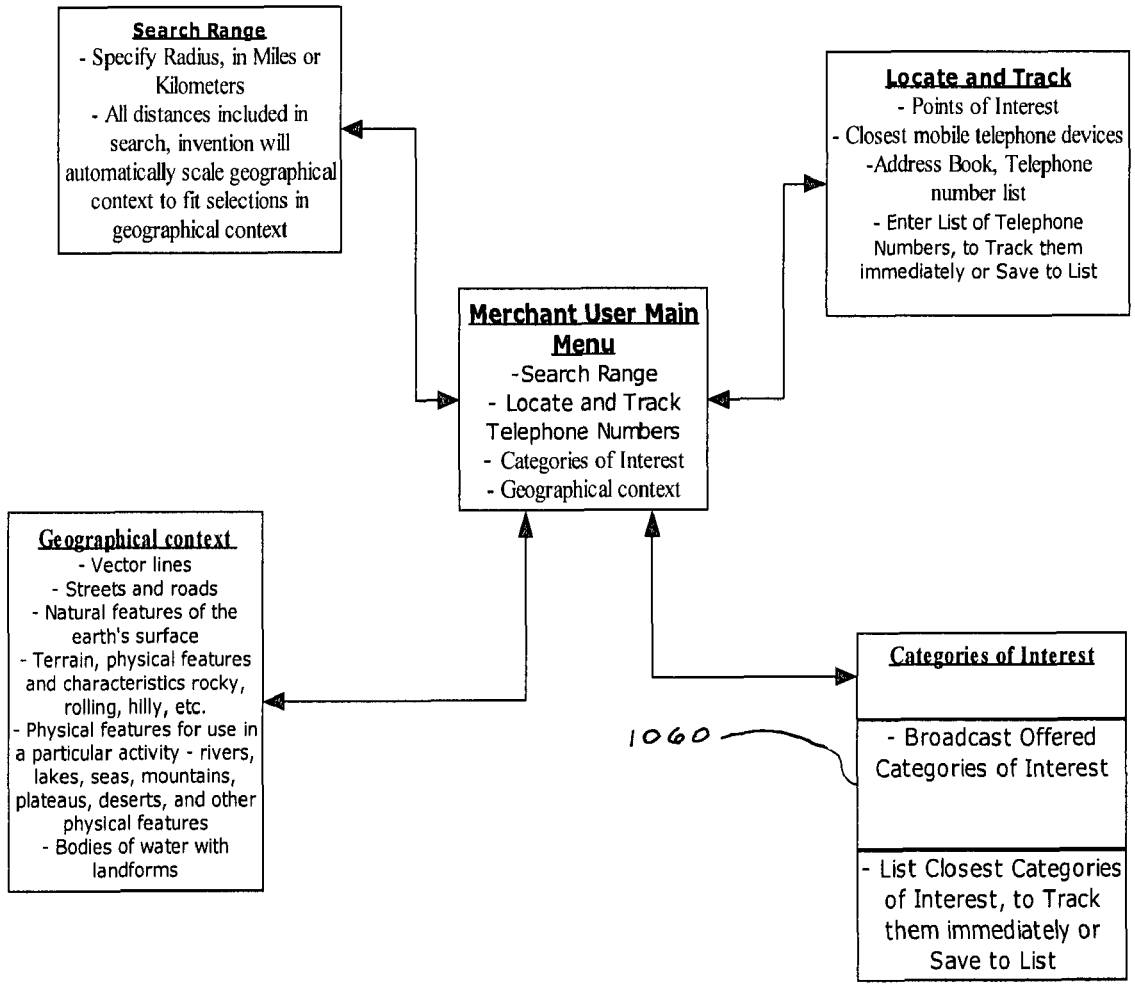
FIG. 10 is a software flow chart illustrating how the navigation system of this invention may be used by small groups of associated users for meeting purposes or social networking.
Figure 11:
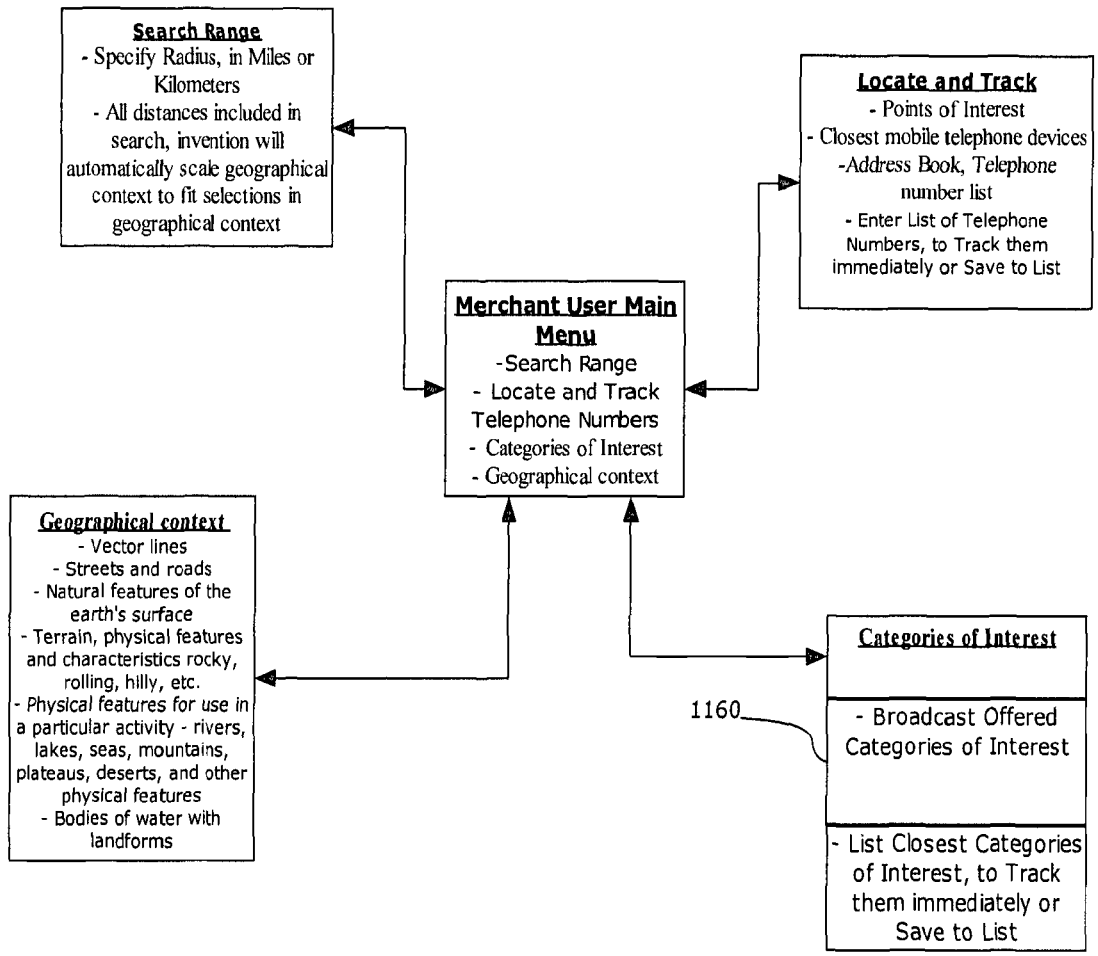
FIG. 11 is a software flow chart illustrating how the navigation system of this invention may be used for public broadcasting position or interest information.

Then, taking the steps shown in FIG. 8, the user responsible for the security manager account must select an account security profile type for each of the accounts from these options: managed private type as shown in FIG. 9, private group profile type as shown in FIG. 10, or public profile as shown in FIG. 11. The account profile type determines which group(s) are able to view current location information for each of the mobile telephone devices as defined here:

Shown in FIG. 9, accounts with a managed private security profile can share location and categories of interest only with user(s) approved and authorized by the security administrator manager account. For example, an adult responsible for administering the system could have a security administrator manager account that allows only the account(s) chosen by the adult to view the categories of interest and location of the adult's children. The following points illuminate the chart shown in FIG. 9:
(i) Managed Private Account Profiles are administered and controlled by Security Administrator Manager Account.
(ii) Managed Private Accounts can be authorized by and from the mobile telephone device itself, then administered and controlled by Security Administrator Manager Account. Accounts with a managed private profile type are intended for adult control of minor cell phones, or any other account where administrative control or privacy is required.
(iii) Managed Private User Location information is secured, user location and any other user information is NOT shared with public.
(iv) Managed Private User Profile Choices in reference number 1110 and 1140 blocks are created, managed, edited and controlled by Security Administrator Manager account only.

As shown in FIG. 10, accounts with a private group security profile share location and categories of interest exclusively with other user(s) who have accepted reciprocal agreements with each other. For example, adults who want to share their location and categories of interest with other consenting adults who have mutually agreed to share their location and categories of interest information are system users who would likely associate their account with a private group security profile.

Shown in FIG. 11, accounts with a public security profile share location and categories of interest with all the users of system embodiments. For example, merchants generally choose to share their interests or items for sale and their current location with the largest group possible, so merchants are an example of system users who would likely associate their account with a public security profile.

The account profile type also determines what menu options are available on the hand held mobile telephone device in FIGS. 9, 10, and 11. The account will hold the profile type, the telephone number, categories of interest and other data. This is a permanent record, which is stored and retrieved by the administrator manager account to allow updates and alterations.

Next the authenticated security administrator manager account user selects the security profile for each telephone number in the list. As described above, the security profile chosen by security administrator manager account user for a telephone number determines the list of items that the mobile telephone user is allowed to track and locate.

The system embodiments provide a facility for the security administrator manager account user to more easily manage the list of items the mobile telephone user is allowed to track and locate by using a search range. A search range allows the administrator to select from a list of possibilities within the chosen distance of a current working location as shown in reference diagram number 850 860 blocks. The current working location is defined as a geospatial location, either local or remote, mobile or static in position, and is combined with a search radius to be used as a metric to filter and/or order subsequent searches on. For example, by using the current working location metric the user selection list can be ordered from least to greatest distance from current working location.

Notification messages to the user occur as mobile device is approaching a desired/expected go to location or undesired/unexpected no go location and are a certain user selected distance from a specified location or mobile telephone device, devices as in Reference number 880 block.

Working locations, waypoints and points of interest can be fixed or static locations. Working locations, waypoints and points of interest are defined by street address lookup, merchant name lookup, person's name lookup, GPS location or by telephone number After the security administrator has registered the user accounts, each of the individual mobile telephone users can access the choices available to their mobile telephone account profile type shown in FIGS. 4, 5, 6, 7.

For FIGS. 8, 9, 10, 11 and other flowcharts, please note that lines with arrowheads on both ends are to denote that the user may choose to navigate bi-directionally down the flowchart tree or up the flowchart tree.

The present invention has been described more fully hereinafter with reference to the accompanying illustrative figures, in which various embodiments of the invention are shown. This invention may, however, be embodied in many different forms and should not be construed as limited to the embodiments set forth herein; rather, these embodiments are provided so that this disclosure of the present invention will be thorough and complete, and will fully convey the scope of the invention to those skilled in the art. Although specific terms are employed herein, they are used in a generic and descriptive sense only and not for purposes of limiting the scope of the present invention as defined by the attached claims in any way. Some terminology will be defined herein and used to describe forthcoming embodiments of the present invention, in order to teach the present invention to those skilled in the art.

The invention claimed is:
1. A non-transitory computer program product for providing mapping functionality to mobile telephone devices, wherein the mobile telephone devices belong to a predetermined group, the computer program product comprising:

mapping commands stored on a computer readable storage medium within each of the mobile telephone devices, said mapping commands, when executed by a processor within said each of the mobile telephone devices, causing the processor to calculate a geographical location of said mobile telephone devices; said mapping commands further:

(i) periodically transmitting an updated geographical location of said each of the mobile telephone devices to an information portal;

(ii) periodically receiving updated geographical locations of other mobile telephone devices that are recognized as belonging to the predetermined group;

(iii) periodically receiving geographical details from the portal; and (iv) showing a respective map on a respective mobile telephone device, wherein showing a respective map comprises:
determining an amount of geographic detail transmitted from the portal to the mobile telephone device;
calculating a speed at which the mobile telephone device is moving;
determining a degree of geographic detail that is to be displayed on the mobile telephone device and that is inversely proportional to the calculated speed;
applying the geographical details on a scaled map displayed by the mobile telephone device; and
scaling the map to include location plots for a plurality of said respective mobile telephone devices.

2. The computer program product according to claim 1, wherein said respective mobile telephone devices are cell phones.

3. The computer program product according to claim 1, wherein said respective mobile telephone devices comprise a receiver for accepting data communications from a satellite.

4. The computer program product according to claim 1, wherein said mapping commands comprise a computer program that calculates the current geographical location of mobile telephone devices.

5. The computer program product according to claim 1, wherein said mapping commands comprise a computer program in electronic communication with a transmitter within respective mobile telephone devices for sending a current geographical location of respective mobile telephone devices to an information portal.

6. The computer program product according to claim 1, wherein said mapping commands comprise a computer program in electronic communication with a receiver for processing location data of respective mobile telephone devices, said location data being received from the portal.

7. The computer program product according to claim 1, wherein said mapping commands comprise a computer program in electronic communication with respective viewing screens on respective mobile telephone devices, for showing the location of a plurality of mobile telephone devices on a single viewing screen at updated intervals determined by respective mobile telephone devices.

8. The computer program product according to claim 1, wherein said mapping commands represent location information regarding a mobile telephone device as a vector.

9. The computer program product according to claim 1, wherein said mapping commands comprise zooming features to expand a portion of a viewed display to show more details of associated mapping information.

10. A computerized system for providing mapping information to portable communications devices comprising:

an information portal in electronic communication with computer hardware, said portal being continually updated with location information of portable communications devices;

a communications network that transmits mapping information to at least one portable communications device, wherein said mapping information comprises a geographical context scaled for display on a portable communications device; and said portable communications device comprises a computer readable storage medium having mapping commands thereon to show the scaled geographical context and the continually updated location information associated with at least one portable communications device, wherein said portal is in electronic communication with computer-usable media having software therein for scaling mapping information, said software comprising scaling commands for determining an amount of geographic detail transmitted from the portal to the portable communications device, and wherein said scaling commands utilize data that is selected from the group consisting of the speed at which the portable communications device is moving, the number of portable communications devices to be displayed on a single device, and combinations thereof, wherein the portable communication device, when the software is executed, is configured to:
calculate a speed at which the portable communication device is moving;
determine a degree of geographic detail that is to be displayed on the portable
communication device and that is inversely proportional to the calculated speed; and
apply the geographical details on a scaled map displayed by the portable communication device.

11. The computerized system according to claim 10, wherein said portable communications device is a mobile telephone device.

12. The computerized system according to claim 10, wherein said information portal comprises databases for storing information regarding respective portable communications devices.

13. The computerized system according to claim 10, wherein said information portal comprises databases for storing information regarding vendors that advertise goods and services to portable communications devices.

14. The computerized system according to claim 10, wherein said information portal comprises a server.

15. The computerized system according to claim 10, wherein said information portal comprises a receiver for receiving data from portable communications devices and storing the data in a database.

16. The computerized system according to claim 15, wherein said data from portable communications devices is selected from the group consisting of device identifier, latitude coordinate of the device, longitude coordinate of the device, altitude coordinate of the device, a global position time stamp, a device clock time stamp, calculated positional parameters, and combinations thereof.

17. The computerized system according to claim 10, wherein said communications network is a cellular radio network.

18. The computerized system according to claim 10, wherein said geographical context is a mapping tile representative of an area in which a portable communications device is located.

19. The computerized system according to claim 10, wherein said portal comprises software for scaling an image to the size of a viewing screen on a portable communications device.

20. The computerized system according to claim 10, wherein said mapping information comprises the location of at least two portable communications devices and said geographical context is scaled to show the location information for each respective portable communications device on the viewing screen of one portable communications device.

21. The computer implemented method according to claim 1, further comprising a power saving module stored on said computer readable storage medium, said power saving module comprising computer commands allowing users of said respective mobile telephone devices the option of determining how often a respective mobile telephone device transmits an updated geographical location of said respective mobile telephone devices to an information portal.

22. The computerized system according to claim 10 wherein said scaling commands utilize the speed at which the portable communications device is moving, said software for scaling mapping information providing an amount of geographic detail that is inversely proportional to a speed at which the portable communications device is moving.

23. A computer implemented method of communicating mapped advertisement information to portable communications devices, comprising:
    continually updating an information portal with location information for portable communications devices;
    continually updating the information portal with categories of interests that can be matched to a portable communications device or to a location;
    retrieving the geographical context of a portable communications device from a geographical context server;
    overlaying the location information and category of interest information on the geographical context;
    scaling the geographical context, the location information, and the category of interest information for display on a portable communication device;
    periodically transmitting updated and scaled mapping information to at least one portable communications device, said mapping information selected from the group consisting of said geographical context, said location information, said category of interest information, and combinations thereof; and
    displaying the updated and scaled mapping information on the at least one portable communications device, the device including mapping commands that are executable by a processor in the portable communications device, wherein said displaying comprises:
    calculating a speed at which the portable communication device is moving;
    determining a level of geographic detail that is to be displayed on the portable communication device and that is inversely proportional to the calculated speed; and
    applying the geographical details on a scaled map displayed by the portable communication device.

24. The computer program product according to claim 23, wherein said portable communications device is a cell phone.

25. The method according to claim 23, wherein the step of continually updating the information portal with location information for portable communications devices comprises receiving the latitude, longitude, and altitude coordinates for each respective device.

26. The method according to claim 23, wherein the step of continually updating the information portal with category of interest information comprises transmitting data from a portable communications device to the portal for associating goods and services with a portable communications device record in the portal.

27. The method according to claim 23, wherein the step of continually updating the information portal with category of interest information comprises entering goods and services data into the portal and associating those goods and services with a geographical location.

28. The method according to claim 23, wherein the step of periodically transmitting updated and scaled mapping information comprises transmitting a mapping tile to the portable communications device.

29. The method according to claim 28, wherein the step of periodically transmitting updated and scaled mapping information comprises calculating the relative position of a portable communication device within the current mapping tile and determining if the device is moving outside the scaled scope of the tile.

30. The method according to claim 29, wherein the step of periodically transmitting updated and scaled mapping information comprises retrieving a new geographical context if the portable communication device is outside the scope of the tile currently displayed on a device.

31. The method according to claim 23 wherein the step of periodically transmitting updated and scaled mapping information to at least one portable communications device comprises receiving preference data from a first portable communications device identifying other portable communications devices or categories of interest for display on the first portable communications device.

32. The method according to claim 31, wherein the step of displaying the updated and scaled mapping information on the at least one portable communications device comprises displaying all preferred portable communications devices and categories of interest on a single mapping tile within the viewing display of the first portable communications device.

33. The method according to claim 31, wherein the step of displaying the updated and scaled mapping information on the at least one portable communications device comprises displaying all preferred portable communications devices and categories of interest on a single mapping tile within the viewing display of all preferred portable communications devices.

34. The method according to claim 33, wherein the step of displaying the updated and scaled mapping information on the all preferred portable communications devices comprises continually updating each respective device with the location of each other respective device.

35. The method according to claim 23, wherein the step of displaying the updated and scaled mapping information on the at least one portable communications device comprises displaying categories of interest associated with the current location of a portable communications device on a single mapping tile within the viewing display of the a portable communications device.

36. A computerized system for transmitting updated mapping information to portable communications devices in a distributed network comprising:
    an information portal in electronic communication with computer hardware configured to managing communications within a portable communications network, said portal comprising:
    a database for aggregating (i) continually updated location information for multiple portable communications devices and (ii) categories of interest records that can be searched and associated with a portable communications device or with a geographic location;

a security profile database for associating user security preferences with portable communications devices and categories of interest records in the information portal, the security profile database configured to establish rules for transmitting information from said database;

a geographical context server for associating mapping information to a respective portable communications device or to a category of interest record;

computer readable storage media in electronic communication with said portal, said storage media having mapping commands that are executable by a processor to create mapping data by overlaying the location and interest information on the geographical context, said mapping commands further operating to scale the mapping data for display on a portable communication device;

a data transmission network for sending data from said portal to portable communications devices connected to said network;

at least one portable communications device connected to said network for periodically transmitting updated location information to said information portal and periodically receiving mapping data from said portal, said portable communications device comprising a computer readable storage medium having a display command sequence that, when executed by a processor in said portable communications device, cause the processor to:

calculate a speed at which the portable communication device is currently moving;

determine a level of geographic detail that is to be displayed on the portable communication device and that is inversely proportional to the calculated speed; apply the geographical details on a scaled map displayed by the portable communication device; and show the scaled geographical context, location information, and category of interest information on a display, wherein at least one portable communications device has a private group security profile, whereby portable communications devices having a private group security profile exclusively share location information and categories of interest with portable communications devices having the same private group security profile.

37. The computerized system according to claim 36, wherein said portable communications device is a cell phone.

38. The computerized system according to claim 36, wherein said security profile comprises computer logic and data that controls the transmission of location information, geographical context information, and category of interest information from the portal to a portable communications device.

39. The computerized system according to claim 36 wherein a user customizes the security profile by transmitting preferences associated with a portable communications device for saving in said portal.

40. The computerized system according to claim 36, wherein a first portable communications device transmits data to said portal for controlling the extent of location information transmitted to other devices regarding the first portable communications device.

41. The computerized system according to claim 37, wherein said portal communicates a message to said first portable communications device when another portable communications device enters or exits a specified location.

42. A computerized method of distributing updated mapping information to portable communications devices in a distributed network, comprising:

aggregating continually updated location information for multiple portable communications devices in an information portal, wherein the information in the portal is updated via a data transmission from a respective portable communications device according to a schedule determined by that device, wherein at least one of the portable communications devices has a private group security profile;

aggregating categories of interests that can be searched and associated with a portable communications device or with a location;

retrieving the geographical context of (i) a respective portable communications device or (ii) a category of interest from a geographical context server;

overlaying the location and interest information on the geographical context;

scaling the combined geographical context and the location and interest information for display on a portable communication device;

periodically transmitting updated and scaled geographical context and location and interest information to at least one portable communications device; and displaying the location and categories of interest information on the at least one portable communications device, the device including mapping commands that are executable by a processor in the portable communications device, wherein said displaying comprises:

calculating a speed at which the portable communication device is moving;

determining a degree of geographic detail to be displayed on the portable communication device that is inversely proportional to the calculated speed; and applying the geographical details on a scaled map displayed by the portable communication device;

wherein the geographic context of the at least one portable communications device having a private group security profile is only transmitted to portable communication devices having the same private group security profile.

43. A computerized system for transmitting updated mapping information to portable communications devices in a distributed network comprising:

an information portal for managing communications within a portable communications network, said portal comprising:

a database for aggregating (i) continually updated location information for multiple portable communications devices and (ii) categories of interest records that can be searched and associated with a portable communications device or with a geographic location;

a geographical context server for associating mapping information to a respective portable communications device or to a category of interest record;

computer readable storage media in electronic communication with said portal, said storage media having mapping commands that are executable by a processor to determine a point of convergence for at least two portable communications devices, said mapping commands creating mapping data by overlaying the location, point of convergence, and interest information on the geographical context, said mapping commands further operating to scale the mapping data for display on a portable communication device;

a data transmission network for sending data from said portal to portable communications devices connected to said network;

at least one portable communications device connected to said network for periodically transmitting updated location information to said information portal and periodically receiving mapping data from said servers, said portable communications device comprising a computer readable storage medium having a display command sequence that, when executed by a processor in said portable communications device, causes the processor to:

calculate a speed at which the portable communication device is moving;

determine a degree of geographic detail that is to be displayed on the portable communication device and that is inversely proportional to the calculated speed;

apply the geographical details on a scaled map displayed by the portable communication device; and show the scaled geographical context, location information, and category of interest information on display.

44. A computer implemented method of communicating mapping information to portable communications devices to foster more efficient meeting arrangements on an ad hoc basis, comprising:

continually updating an information portal with location information for a first portable communication device and a second portable communication device continually updating the information portal with categories of interests that can be matched to at least one of the first and second portable communications devices or to a location;

calculating a point of convergence for the first and second portable communication devices;

determining a speed at which at least one of the first and second portable communication devices is currently moving;

calculating a degree of geographic detail to be displayed on the respective moving portable communication device that is inversely proportional to the calculated speed;

applying the geographical details on a mapping display to be displayed by the respective moving portable communication device;

scaling the mapping display showing the location of the first and second portable communications devices and the point of convergence for display on at least one of the first and second portable communications devices;

periodically transmitting an updated and scaled version of the mapping display to at least one of the first and second portable communications devices; and showing the updated and scaled mapping display on any or all of the portable communications devices, the devices including mapping commands that are executable by processors in the portable communications devices.

45. The computer implemented method according to claim 44, wherein at least one of the first and second portable communication devices is a mobile telephone device.

46. The computer implemented method according to claim 44, wherein the step of showing the updated and scaled mapping display comprises showing data selected from the group consisting of geographical context, location information for a portable communications device, categories of interest, and combinations thereof.

47. The computer implemented method according to claim 44, wherein the step of calculating the point of convergence comprises utilizing the position of the first and second portable communication devices, the speed of the first and second portable communication devices, and/or the direction of travel of the first and second portable communication devices.

* * * * *